United States Patent [19]

Isik et al.

[11] Patent Number: 5,586,221
[45] Date of Patent: Dec. 17, 1996

[54] PREDICTIVE CONTROL OF ROLLING MILLS USING NEURAL NETWORK GAUGE ESTIMATION

[75] Inventors: Can Isik, Syracuse, N.Y.; Joseph Zagrobelny, Kingston, Canada

[73] Assignee: Syracuse University, Syracuse, N.Y.

[21] Appl. No.: 270,143

[22] Filed: Jul. 1, 1994

[51] Int. Cl.⁶ .................. G06E 1/00; G06E 3/00
[52] U.S. Cl. ............ 395/22; 395/51; 395/906; 364/148; 364/162; 364/165; 364/183
[58] Field of Search ............... 395/22, 51, 906; 364/148, 162, 165, 183

[56] References Cited

U.S. PATENT DOCUMENTS

| | | | |
|---|---|---|---|
| 3,574,280 | 4/1971 | Smith | 72/8 |
| 4,654,812 | 3/1987 | Yoshida | 364/578 |
| 4,884,216 | 11/1989 | Kuperstein | 364/513 |
| 4,931,951 | 6/1990 | Murai et al. | 364/513 |
| 5,111,531 | 5/1992 | Grayson et al. | 395/23 |
| 5,148,370 | 9/1992 | Litt et al. | 364/468 |
| 5,159,660 | 10/1992 | Lu et al. | 395/22 |
| 5,212,791 | 5/1993 | Damian et al. | 395/650 |
| 5,268,834 | 12/1993 | Sanner et al. | 364/151 |
| 5,349,646 | 9/1994 | Furuta et al. | 395/22 |
| 5,386,373 | 1/1995 | Keeler et al. | 364/577 |
| 5,388,186 | 2/1995 | Bose | 395/11 |
| 5,396,415 | 3/1995 | Konar et al. | 364/162 |
| 5,428,559 | 6/1995 | Kano | 364/578 |
| 5,477,444 | 12/1995 | Bhat et al. | 364/152 |
| 5,479,573 | 12/1995 | Keeler et al. | 395/23 |

OTHER PUBLICATIONS

"Identification of a Nonlinear Multivariable Dynamic Process Using Feed-Forward Networks", IEEE Nerual Networks Council, Mar. 28–Apr. 1, 1993 (vol. I) Isik and Cakmakci.

"Neural Control of a Steel Rolling Mill", IEEE 0272–1708/93, D. Sbarbaro–Hofer, D. Neumerkel, and K. Hunt.

"Application of Neural Network Methodology to the Modelling of the Yield Strength in a Steel Rolling Plate Mill", Neural Inforamtion Processing Systems 4, 1992, A. Tsoi.

"Neural Control for Rolling Mills: Incorporating Domain Theories to Overcome Data Deficiency", Neural Information Processing Systems 4, 1992, M. Röscheisen, R. Hofmann, and V. Tresp.

*Primary Examiner*—Robert W. Downs
*Assistant Examiner*—A. Katbab
*Attorney, Agent, or Firm*—Harris Beach & Wilcox, LLP

[57] ABSTRACT

A system for controlling the output of a rolling mill. An intelligent control system is part of a control loop between the mill and a PID controller. The control loop does not rely on the output of an exit gauge sensor in normal operation. The intelligent control system can be an artificial neural network or a parallel cascade network, and has an output node for generating an output signal that is predictive of the exit gauge at a future time. A comparator coupled to the artificial neural network output signal and to a reference signal derives an error signal which is fed to the PID controller for modulating the metal thickness.

15 Claims, 3 Drawing Sheets

PREDICTIVE CONTROL OF ROLLING MILLS USING NEURAL NETWORK GAUGE ESTIMATION

BACKGROUND OF THE INVENTION

1. Field of the Invention

This invention relates to the control of metal rolling mills. More particularly this invention relates to the use of an adaptive artificial neural network in a control loop for regulating the final gauge of a metal sheet produced by a metal rolling mill.

2. Description of the Prior Art

An integrated rolling mill passes a preprocessed metal casting through a succession of rolling stages to yield a homogeneous metal plate. This invention is directed to the control of the thickness of the metal in a rolling mill.

Control of the output of a metal rolling mill to achieve a product having a uniform gauge is a complex problem. Rolling mills are an example of complex industrial systems whose outputs are affected by a multiplicity of non-linear, time-varying states that are mutually coupled in an uncertain manner. For example it is known that the yield stress of the metal is a non-linear function of the strain rate, temperature, and the passage velocity. Internal states in the mill itself also affect the rolling force at any given instant. Prediction of the behavior of a rolling mill defies closed solution.

Proportional integral-derivative controllers (PID controllers) are commonly used in the art to control the rolling force of the mill in order to achieve exit gauge uniformity within a target range. This control method is limited by transportation delays of the metal from the mill rolls to the gauge sensors, which are necessarily spaced apart from the rolls. The method is further limited by the inherent delay in the operation of the gauge sensors, by sparsity of measurement data, and by high frequency noise and other systematic error in the measurements. The achievable target range is relatively large with this technique.

More sophisticated predictive approaches to rolling mill operation such as rule-based expert systems and highly parameterized analytic models have been attempted. More recently artificial neural networks have been introduced to solve certain problems of rolling mill operation.

For example in Ah Chung Tsoi, *Advances in Neural Information Processing* (vol. 4), Houson and Lippman, Eds., Morgan Kaufman, 1992, pp. 698–705 there is disclosed an empirically derived mathematical formula for predicting yield stress $$k_m = a\epsilon^b \sin h^{-1}(c\bar{\epsilon} \exp(d/T^f))$$

where $k_m$ is the yield stress, $\epsilon$ is the strain, $\bar{\epsilon}$ is the corresponding strain rate, T is temperature, and a, b, c, d, and f are unknown constants. Tsoi further suggests that an artificial neural network employing an additive nonlinear model and using the independent variables of the above equation can accept a training data set taken from previous mill runs to predict the actual output of the plate mill with a smaller error than the above equation.

Lu et al, U.S. Pat. No. 5,159,660, discloses an adaptive control system for a complex process that incorporates an artificial neural network. The inputs to the artificial neural network are a time sequence of error values, and the neuron paths are weighted as a function of these error values and also of the process output. While this technique is suitable for certain kinds of processes having nonlinear time-varying behavior, it has the same limitation of other prior art attempts to control a rolling mill, namely the delay between the present states of the mill and the measurement of the mill's output.

Another application of an artificial neural network to a somewhat different problem is disclosed in Röscheisen et al, *Advances in Neural Information Processing* (vol. 4), Houson and Lippman, Eds., Morgan Kaufman, 1992, p. 659, there is disclosed a solution to the control problem of determining a reduction schedule for the mill. Neural nets having specialized architectures and utilizing a Bayesian framework were trained to represent an instantiation of a large parameterized analytic model for this problem. The operations of the nets were then cross-validated with the predictions of the analytic model, particularly in regions of an input hyperspace where no data were available. While this publication is of theoretical interest, it does not explain how an artificial neural network could actually be implemented into the control devices of an operating rolling mill.

More recently Sbarbaro-Hofer et al, *IEEE Control Systems*, June 1993, pp 69–75 address the problem of neural control of a steel rolling mill. In this document an internal model control scheme and a predictive control model scheme are proposed. Both schemes use simplified mathematical assumptions for the development of training data for the artificial neural network. In the internal model scheme, the network is employed in a closed loop control arrangement with incorporation of suitable filters and time delays. In the predictive model, discrete dynamic optimization of the model is undertaken. In both cases, feedback to the network is provided by coupling an input of the network to the exit gauge sensor, and the network is thus dynamically adapted. However the dynamic response of the network is irreducibly delayed by the dead time measured from the metal passing between the rollers and the output of the exit gauge. The authors essentially approach a complex nonlinear control problem by utilizing an artificial neural network to directly modify the output of the PID controller, or to replace the controller entirely. The models utilized by the authors ignore noise effects, as well as the dynamic effects of the sensors and actuators. While ignoring such effects may be useful for theoretical study, it is a luxury that cannot be indulged in controlling a practical rolling mill.

SUMMARY OF THE INVENTION

It is therefore a primary object of the present invention to utilize an artificial neural network to regulate the operation of a rolling mill with minimal measurement delay.

It is a further object of the present invention to improve performance of a rolling mill controller to reduce the amplitude of irregularities in the mill's output.

It is another object of the present invention to improve the bandwidth of a rolling mill controller utilizing an artificial neural network.

It is still another object of the present invention to utilize a feed-forward type artificial neural network to provide a predictive value in the control loop of a rolling mill to increase the feedback gain while insuring stability of the control system.

The inventors have found that the performance of metal rolling controllers can be drastically improved if the measurement delay inherent in the control loop is reduced. This measurement delay, or transportation delay, is due to the travel of the metal sheet from the rolls to the exit gauge, which can only be placed away from the rolls. The delay is avoided by feeding instantaneous time varying measurable states of the rolling mill to the input layer of a feed-forward artificial neural network and coupling the output of the network to a PID controller. By utilizing a sufficient number of input states, the network is capable of modeling the complex non-linear dynamic system represented by the rolling mill. The artificial neural network has been trained to estimate the thickness of metal sheet as it exits a rolling mill before actual measurement is done at the exit gauge. The artificial neural networks have been tested at two different passes and at a variety of mill speeds. The measurement delay has been reduced from 70–120 ms (depending on the mill speed) to 20 ms. As a result of the reduced delay, the related bound on the system bandwidth is improved from 2–3 Hz to 8.3 Hz at a sampling rate of 100 Hz. The frequency spectrum of the estimated signal very closely matches that of the original gauge signal up to about 10 Hz. This bandwidth can be further improved using frequency equalization. An important difference between the invention and the prior art method is that the artificial neural network's output is substituted for the output of the exit gauge sensor as the input of the PID controller. The artificial neural network does not act directly on the output of the PID controller.

A control system controls a complex industrial process of the type having a plurality of nonlinear, time-varying states that are mutually coupled in an uncertain manner. The industrial process has a process input, and a process output that is dependent on the time-varying states, and is responsive to a control signal for changing the process output. The system includes an artificial neural network having an input layer comprising a plurality of input nodes. The input nodes are coupled to signals that are representative of the time-varying states at a current time. The artificial neural network has a hidden layer and an output node for generating an output signal that is predictive of the process output at a future time. A comparator is coupled to the output signal and to a reference signal for deriving an error signal. A controller responsive to the error signal for generating the control signal to affect the process output.

The controller can be a proportional integral-derivative controller, or it can be an expert system.

In another aspect of the invention, the artificial neural network comprises 25 input nodes, 15 hidden nodes, and only one output node, the input nodes being partially interconnected with the hidden nodes.

In one aspect of the invention the system controls the output of a rolling mill of the type having a feedforward apparatus, and a roller that produces a product having an exit gauge, the mill having a plurality of time varying states the system comprising. An artificial neural network has an input layer comprising a plurality of input nodes coupled to signals that are representative of the time-varying states at a current time. The artificial neural network has a hidden layer and an output node for generating an output signal that is predictive of the exit gauge at a future time. A comparator is coupled to the output signal and is also coupled to a reference signal that is indicative of a desired exit gauge. The comparator derives an error signal that is representative of a difference between the output signal and the reference signal. A controller for modulating the feedforward apparatus is responsive to the error signal.

The mill includes an exit gauge sensor. In an aspect of the invention a selector monitors the output signal of the artificial neural network. In the event the artificial neural network is operating within predetermined limits, the selector couples the output signal of the artificial neural network to the comparator. In the event the artificial neural network is operating outside the limits, the selector couples the output of the exit gauge sensor to the comparator means.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE PREFERRED EMBODIMENT

The discussion below is presented with respect to a rolling mill. However those skilled in the art will appreciate that the apparatus and techniques disclosed herein are applicable to other complex industrial systems that are time-varying, non-linear, and have complex coupling between their inputs and delayed measurements of their outputs.

Figure 1:
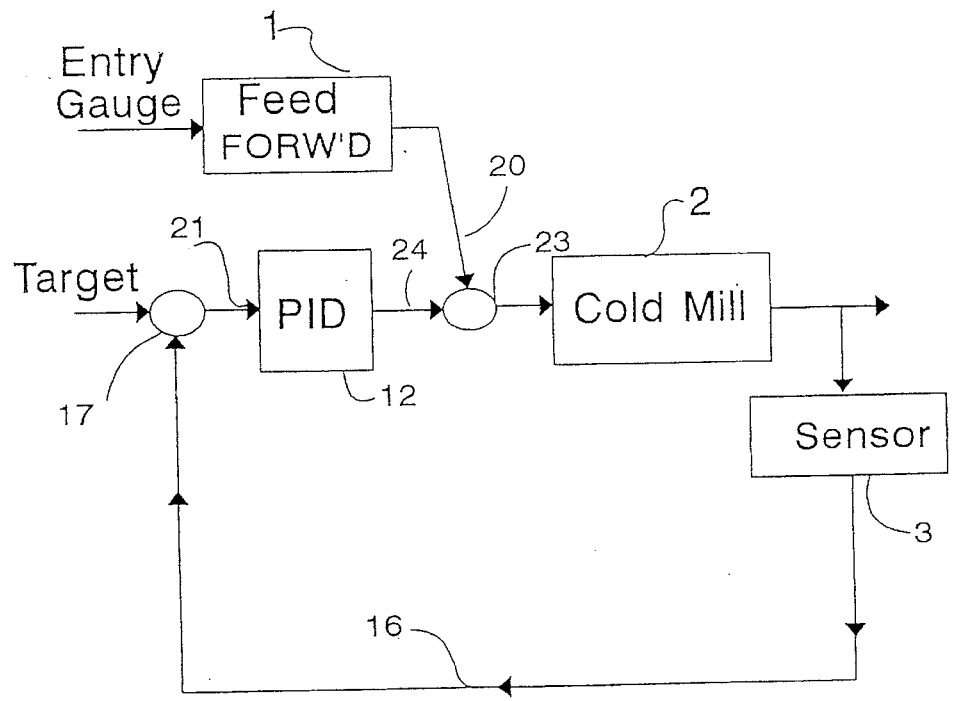
FIG. 1 is a block diagram of a control system for a rolling mill in accordance with the prior art.

It will be helpful in understanding the process in accordance with the invention to review the conventional system for controlling a rolling mill. FIG. 1 illustrates in block form a cold mill automatic gauge control loop 2 that generates a control signal 23. Signal 23 is the reference to the mill's hydraulic cylinder controller, which essentially controls the bottom work roll position for the automatic gauge control system. The thickness of the incoming metal, measured by the entry gauge, is used by the feed forward control system 1 to generate a supplementary control signal 20. A primary control signal 24 is generated by a PID controller 12. The control signal 23 is the sum of the supplementary control signal 20 and the primary control signal 24. A sensor 3 monitors the exit gauge from the mill, and produces an output signal 16 that is coupled to a comparator 17. The comparator develops an error signal 21 that represents a deviation between the output signal 16 and a target value 25. The error signal is coupled to the input of the PID controller 12, which produces a control signal 24 which is the main component of the total control signal 23 that modifies the metal thickness.

Figure 2:
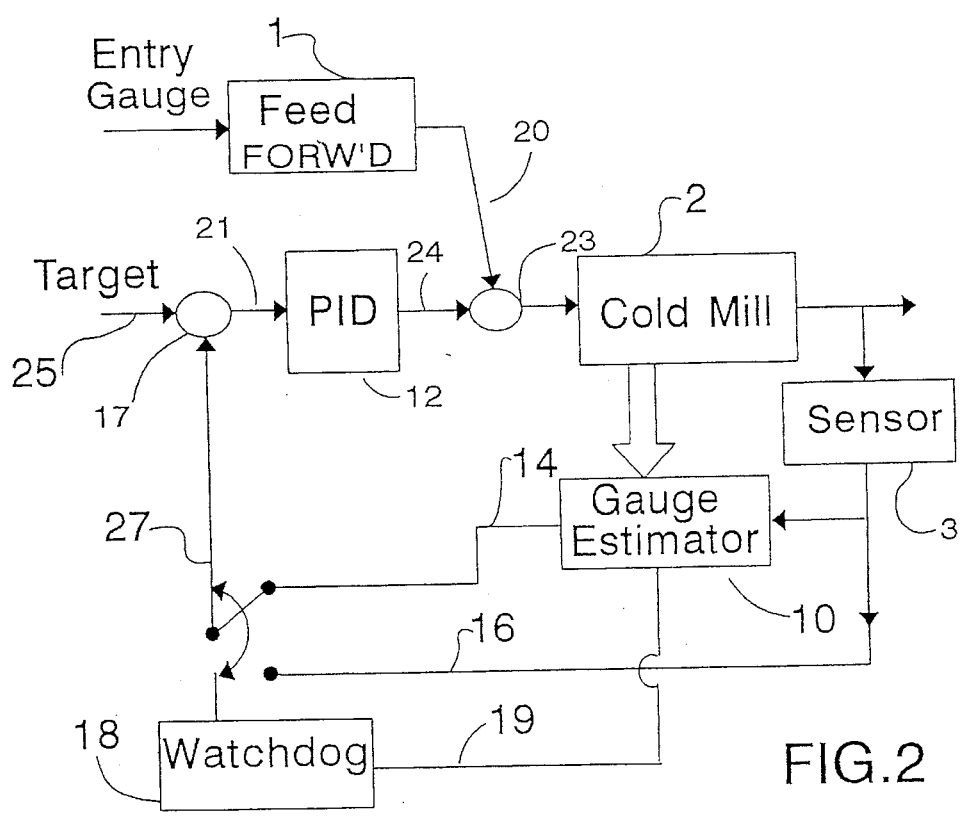
FIG. 2 is a block diagram of a control system for a rolling mill in accordance with the invention.

In FIG. 2 is shown a diagram of a rolling mill having a control to regulate the exit gauge of the mill's output product in accordance with the invention. The mill has a control (not shown) that allows the operator to set the target exit gauge of the output product. As in the prior art mill discussed with respect to FIG. 1, a comparator 17 has an input 27 that is representative of the current state of the mill's operation and generates an error signal 21 according to deviations from the target value that is coupled to a conventional PID controller 12. The exit gauge of the metal is monitored by exit gauge sensor 3. A gauge estimator 10, realized as a feed-forward artificial neural network, is shown in a supplementary role to the PID controller 12 that generates the main control signal 24, which when combined with supplementary control signal 20 forms the total control signal 23. The artificial neural network accepts as its inputs a plurality of internal, time varying states of the cold mill 2, and produces an output signal 16 that is a function of the mill's operation and is representative of its output. In the embodiment of FIG. 2, the artificial neural network estimate signal 14 replaces the output signal 16 of the exit gauge sensor 3 as long as the control loop is functioning in within acceptable error bounds. A watchdog program 18 monitors the artificial neural network operation, and switches to the exit gauge sensor signal 16 when a problem with the gauge estimator 10 is detected. An error signal 19 output by the gauge estimator 10, is used as an input for the watchdog program 18.

The use of instantaneous measurements of mill state variables as the input for the gauge estimator 10, instead of the exit gauge sensor signal (which is a delayed measure of the metal thickness), results in a much tighter, more accurate feedback control of the mill than the prior art arrangement of FIG. 1.

Figure 3:
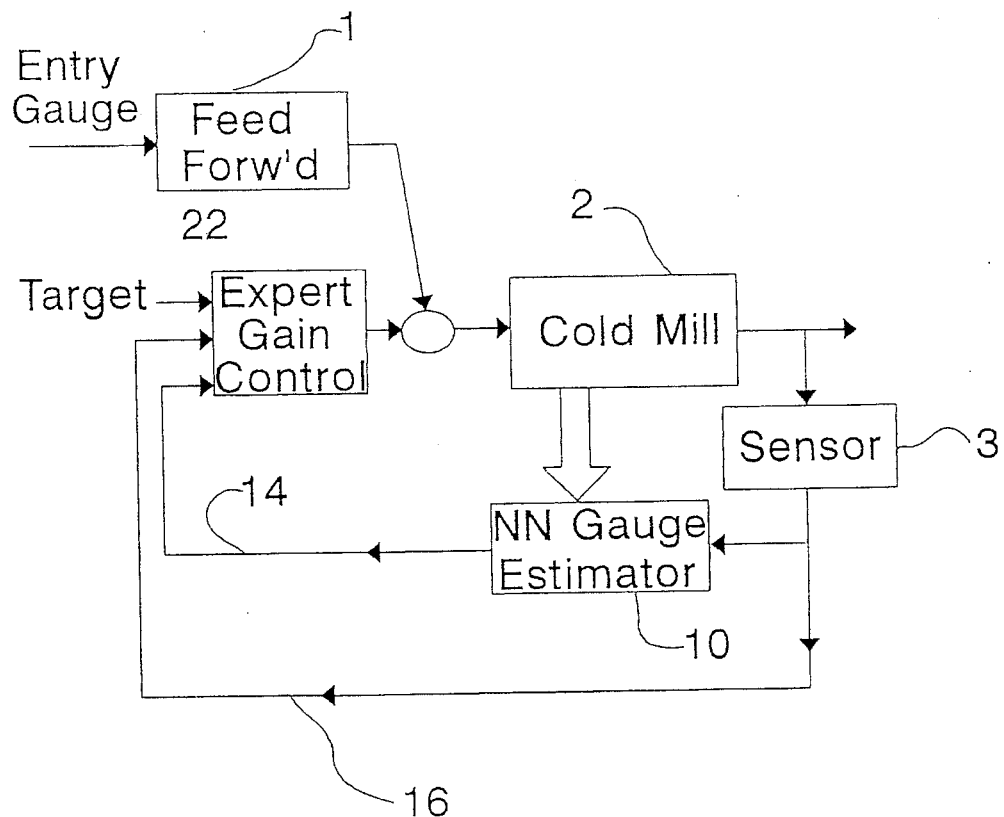
FIG. 3 is a block diagram of a control system for a rolling mill in accordance with an alternate embodiment of the invention.

FIG. 3 shows an alternate arrangement in accordance with the invention that has the same basic arrangement of FIG. 2, except that the conventional PID controller has been modified to accept two inputs as well as the target reference value and has been endowed with intelligence, so that it now operates as an expert system 22. The expert system 22 is aware of the target value and is coupled to both the gauge estimator signal 14 and the exit gauge sensor signal 16. The artificial neural network estimation errors depend on, among other things, the status of the connection weights. The errors are large when the weights are initialized randomly, and become small when they have converged. And there is a large spectrum in between. When the rolls of the cold mill 2 wear out, the system behavior changes, and so do the weights. The alloy type also will have an effect on the system behavior. Therefore a combination of the exit gauge sensor signal 16 and the artificial neural network signal 14 can be used to control the operation of the cold mill 2 according to a set of rules. The controller gains can also be changed over a continuous scale, in accordance with a ratio or other function of the two time varying signals 14 and 16. The expert system 22 having an output that changes smoothly under varying conditions can be used to do the switchover, or to appropriately assign weights to the signals 14 and 16. The expert system 22 can be implemented by a computer program in any of several known ways.

Figure 4:
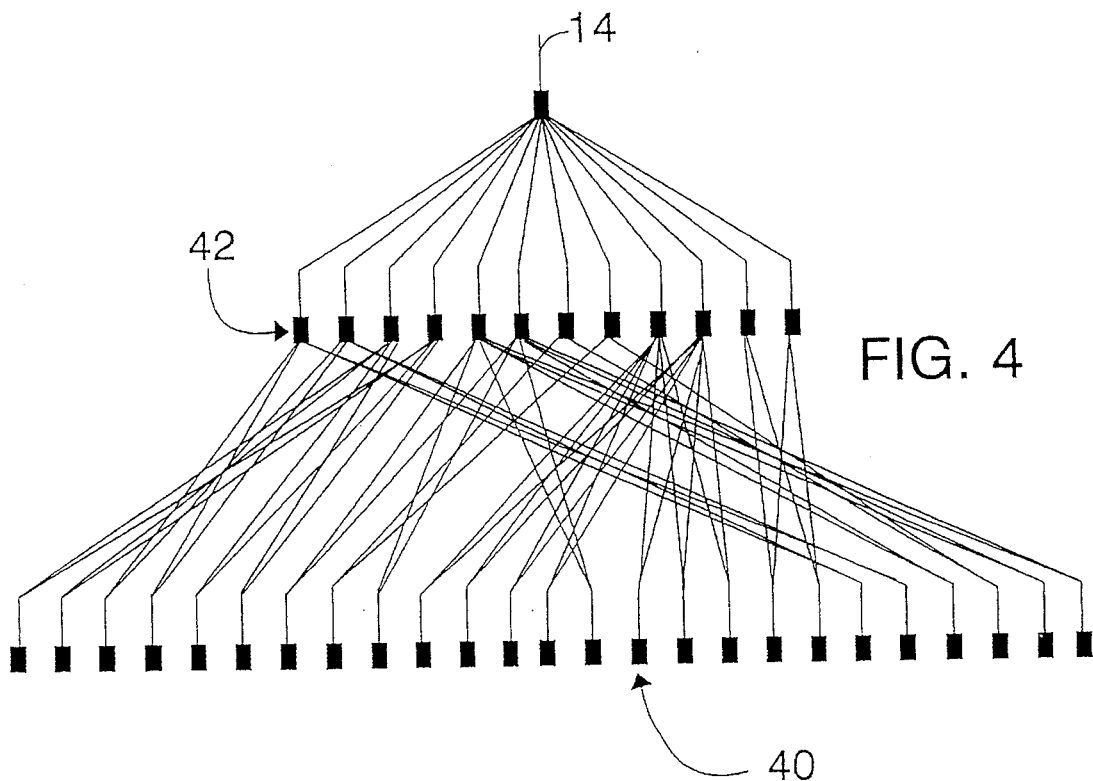
FIG. 4 is a diagram of an artificial neural network that is employed in the invention.

The preferred architecture of the gauge estimator 10 is shown in FIG. 4. It is a feedforward artificial neural network, with an input layer 40 having 20–25 input nodes, a hidden layer 42 having 10–15 nodes and 1 output node 44, which delivers an estimate of the process output as signal 14. The exact number of nodes is not critical, and parametric studies have shown that performance/computational load choices may depend on individual users. As can be seen, the hidden layer is partially connected to the input layer. It will be apparent to those skilled in the art that other process outputs can be added to the output layer, or to decouple computations, additional artificial neural networks can be added to estimate them. It will also be apparent that a neural network design is not unique. A neural network with a different number of layers and nodes can be designed to function as well as that described above.

A commercial artificial neural network development software package, *Neuralworks Professional II Plus*, Version 4.05, published by Neuralware Co. of Pittsburgh, Pa., has been used to develop, test, and prototype the invention off-line, in parallel to the existing controller. An associated product, *Designer Pack*, available from the same publisher, has been used to generate the source code of the artificial neural network in "C" language. The source code was linked with other routines that perform standard input/output and normalization functions.

The specific parameters of the artificial neural network are as follows. The learning algorithm is standard back propagation. In the prototype version, connection weights are initialized to random numbers uniformly distributed with the range $[-0.1, +0.1]$. A hyperbolic tangent transfer function within a range of $[-1, +1]$ is used for each node. The learning rate and the momentum terms each start in a range of 0.5 to 0.8, and smoothly decrease to a range of 0.05 to 0.15. Variations within those ranges do not significantly vary the system performance.

The signals representing the mill states used as input will now be explained. The artificial neural network elements are interconnected with weights which are adaptively varied in order to minimize the difference of the artificial neural network signal 14 and the exit gauge sensor signal 16. It has been observed that an artificial neural network with random initial weights converges to a stable state fairly rapidly. While no efforts were made to minimize the convergence time, stable weights were reached about midway through the acceleration phase of the rolling mill (about 2000 samples, including the head end of the coil).

Mill variables are used in different ways by the gauge estimator 10:

(1) Input gauge: the value of the entry or input gauge is an advance measurement of the input stock thickness. This is compensated before a measurement is used as an input to the artificial neural network. The amount of advance is computed using the input speed of the stock (explained below).

(2) Exit gauge deviation: the value of the exit gauge is a delayed measurement of the exit stock. This is compensated before the exit gauge measurement is used as the reference signal. The amount of delay is computed using the exit speed of the stock. The exit gauge deviation is not used as a signal at the input of the artificial neural network. It is used to calculate the estimation error, with a delay. Training of the neural net thus occurs with a delay of 15–25 samples, depending on the mill speed. Since what the artificial neural network learns is the dynamic model of the mill, which does not change rapidly, this delay does not cause any problem. It does require that a list of the recent system states and the artificial neural network output be maintained, in order to synchronize the states of the mill, the exit gauge measurement, and the exit gauge estimate.

(3) Stressometer roll speed: used as the exit speed. The input speed is calculated from the exit speed using the reduction ratio.

(4) Other speed: (unwind, rewind, etc.) the current value (at t) and an immediate past value (at t−1) are used as input to artificial neural network. The two successive values are utilized to infer acceleration information as needed.

(5) Other data: (pressure, current, voltage, etc.) the current value is used as an input to the artificial neural network. Such data directly relate to forces and torques with minimal delay; therefore only one value at a time is used.

An important aspect of the invention lies in the synchronization of the measured signals. The synchronization method is explained in this section. The actual input thickness of the stock at the rolls at period t is measured TI samples in advance. TI is found by calculating the length of the input stock from the input speed VI and comparing it to the distance of the input gauge from the rolls (DI).

$$\sum_{i=t-TI'}^{t-1} VI(i) \cdot \tau \leq DI \leq \sum_{i=t-TI'-1}^{t-1} VI(i) \cdot \tau$$

$\tau$:sampling period, $TI' \leq TI \leq TI'+1$

That is, TI is not necessarily an integer. The input thickness of the stock at t is found by interpolating between the two input gauge measurements at t–TI' and t–TI'–1.

The actual exit thickness of the stock at the rolls at sampling period t is measured with a delay of TE samples. TE is found by calculating the length of the exit stock from the exit speed VE and comparing it to the distance of the exit gauge from the rolls (DE). Due to the similarity of the computations, the equations will not be given here. Again, TE is not necessarily an integer, and an interpolation between two exit gauge measurements at t+TE' and t+TE'+1 gives the exit thickness.

EXAMPLE 1

The gauge estimator 10 was interfaced to a production 88 inch aluminum cold rolling mill with conventional optical isolators of the type having both input and outputs of ±5 volts. The mill's exit gauge sensor was situated 6 feet from the roll gap. All necessary signals were available at mill's control panel. Twelve bit analog-to-digital (A/D) convertors produced by Infotech Systems were used. Internally all variables were represented in single precision using C language type "float". Twenty channels were allocated as shown in the following table.

| A/D input | Description |
| --- | --- |
| 1 | AGC Operator side pressure |
| 2 | AGC Drive side Pressure |
| 3 | AGC Op side position error |
| 4 | AGC Dr side position error |
| 5 | Op side load |
| 6 | Dr side load |
| 7 | Roll bend balance pressure |
| 8 | Roll bend contour pressure |
| 9 | Shape roll speed |
| 10 | Entry gauge deviation |
| 11 | Exit gauge deviation |
| 12 | Unwind motor speed |
| 13 | Unwind armature current |
| 14 | Unwind armature volts |
| 15 | Unwind field current |
| 16 | Unwind coil diameter |
| 17 | Stand motor speed |
| 18 | Stand armature current |
| 19 | Stand armature volts |
| 20 | Rewind coil diameter |

Channels 1–10 and 12–20 were used as inputs of the artificial neural network. Channel 11 corresponds to signal 16 (FIG. 2) and was used for training the artificial neural network, but was not used for gauge prediction during operation. All values were normalized to the its operating range.

The data collection was controlled by a HP 9000 computer at a rate of 100 Hz. The artificial neural network algorithm was executed on a Vaxstation 3100 computer which was connected to the HP 9000 via a HPIB interface bus.

The system was tested in parallel with the mill's existing control at two different passes and at a variety of mill speeds. The signal generated by the artificial neural network was not actually connected to the PID controller, but was correlated with the exit gauge in a test environment.

Results: The measurement delay was reduced from 70–120 ms (representing typical delays in prior art arrangements, depending on the mill speed) to 20 ms. The 20 ms delay corresponds to two sampling periods, during which the metal traveled approximately 12 inches from the roll gap. As a result of the reduced delay, the related bound on the system bandwidth was improved from 2–3 Hz to 8.3 Hz at a sampling rate of 100 Hz. The frequency spectrum of the estimated signal very closely matches that of the original gauge signal up to about 10 Hz.

Figure 5:
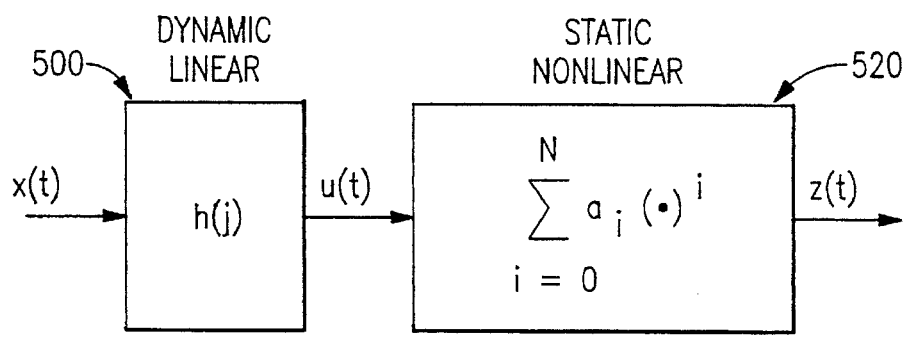
FIG. 5 is a block diagram of an intelligent control in accordance with an alternate embodiment of the invention.
Figure 6:
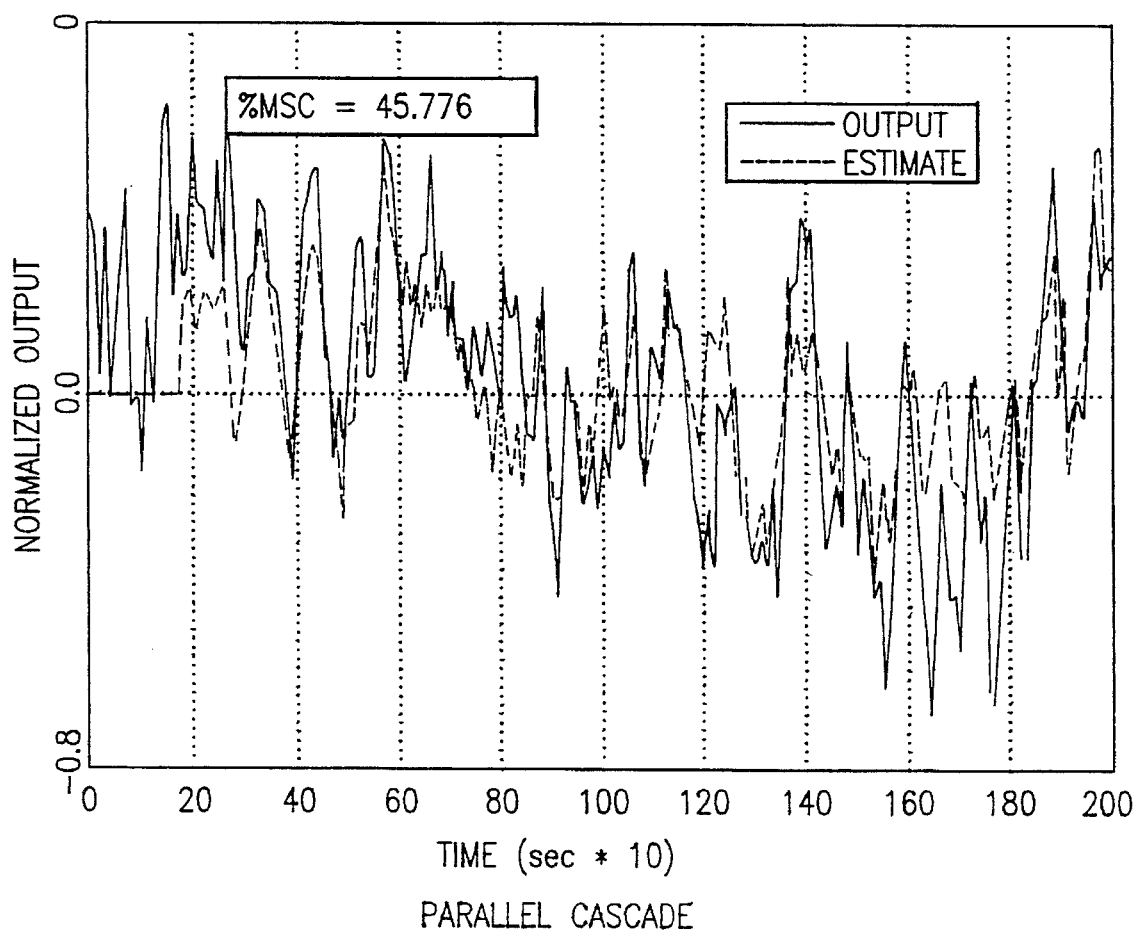
FIG. 6 is a graph indicating the performance of the control system shown in FIG. 5.

Another alternate embodiment of the invention will now be explained with reference to FIGS. 5 and 6. The gauge estimator 10 in FIG. 2 can be realized using a method called the parallel cascade method for nonlinear system identification. This method, is a related form of artificial neural network, and thus falls under the category of Intelligent Control. In this method, a combination of linear and nonlinear elements are constructed as shown in FIG. 5. The first block is a dynamic linear system 500 and the second block is a static nonlinear system 520, which can be a polynomial, gate function, or other nonlinear function. The linear element is derived by taking a first or higher order cross correlation between one of the inputs (A/D Input Table) and the plant output. The output of the linear element (u(t)) is calculated and in the case where the nonlinear element is a polynomial, the coefficients are determined by solving a linear set of equations as follows:

$$\overline{y(t)u_1^i(t)} = \sum_{i=0}^{I} a_{1i} \overline{u_1^{i+1}(t)}$$

The overbar indicates the time average, I is the polynomial order, y(t) is the plant output in the case of the first cascade and is the residual for each successive cascade, and the subscript 1 indicates that it is the first cascade.

In the case of rolling mill control a fifth order polynomial seemed to give the best results. During training the output of the cascade, z(t), which is the combination of static linear and dynamic nonlinear elements, is calculated and a residual error is found by subtracting the cascade output from the plant output. If this residual error is reduced by a threshold amount, the cascade is added as a new node to the system model, which ultimately becomes a number of these cascades connected in parallel (in the rolling mill case it was approximately 60). A new cascade is formed by repeating the process using the residual in determining each successive block in the cascades. The process is repeated until the estimate of the exit gauge is obtained with an acceptable accuracy. The final architecture of the operating network is thus dynamically configured during the training process. The output 14 (FIG. 2) represents the z(t) summed over all the cascades that were developed during training.

EXAMPLE 2

The embodiment of FIG. 5 was connected to a rolling mill in the manner described in Example 1. FIG. 6 shows the actual performance of the mill as compared with the trained parallel cascade model's estimate. It is evident that the parallel cascade model is an excellent predictor of the mill's output.

While this invention has been explained with reference to the structure disclosed herein, it is not confined to the details set forth and this application is intended to cover any modifications and changes as may come within the scope of the following claims:

What is claimed is:

1. A control system for controlling a complex industrial process of the type having a plurality of nonlinear, time-varying states that are mutually coupled in an uncertain manner, the industrial process having a process input, and a process output that is dependent on said time-varying states, the industrial process being responsive to a control signal for changing said process output, the system comprising:

an artificial neural network having an input layer comprising a plurality of input nodes, said input nodes being coupled to state signals that are representative of said time-varying states at a current time and said neural network having a hidden layer and an output node for generating an output signal, said neural network being trained in a training cycle wherein said each state signal is delayed by a predetermined time when presented to said neural network with said process output, thereby sychronizing said process output with past state signals so that said output signal is predictive of said process output at a future time;

comparator means coupled to said output signal and coupled to a reference signal for deriving an error signal that is representative of a difference therebetween; and control means responsive to said error signal for controlling said industrial process.

2. The system in accordance with claim 1, wherein said control means comprises a proportional integral-derivative controller.

3. The system in accordance with claim 1, wherein said artificial neural network comprises 25 input nodes, 15 hidden nodes, and only one output node, said input nodes being partially interconnected with said hidden nodes.

4. The system in accordance with claim 1, wherein said control means comprises an expert system.

5. A system for controlling the output of a rolling mill of the type having a roller that produces a product of a desired thickness, the mill having an exit gauge for measuring a process output, and a plurality of time varying states, the system comprising:

an artificial neural network having an input layer comprising a plurality of input nodes, said input nodes being coupled to state signals that are representative of said time-varying states at a current time and said neural network having a hidden layer and an output node for generating an output signal, said neural network being trained in a training cycle wherein said each state signal is delayed by a predetermined time when presented to said neural network with said process output, thereby synchronizing said process output with past state signals so that said output signal is predictive of said exit gauge process output at a future time;

comparator means coupled to said output signal and coupled to a reference signal indicative of a desired exit gauge for deriving an error signal that is representative of a difference between said reference signal and said output signal; and a controller responsive to said error signal for controlling the product thickness.

6. The system in accordance with claim 5, further comprising:

an exit gauge sensor having an output;

a selector for monitoring said output signal of said neural network; in the event said neural network is operating within predetermined limits, said selector coupling said output signal of said neural network to said comparator means, and in the event said neural network is operating outside said limits said selector coupling said output of said exit gauge sensor to said comparator means.

7. The system in accordance with claim 5, wherein said artificial neural network comprises 25 input nodes, 15 hidden nodes, and only one output node, said input nodes being partially interconnected with said hidden nodes.

8. The system in accordance with claim 5, wherein said controller comprises a proportional integral-derivative controller.

9. A method for controlling the output of a rolling mill of the type having a roller that produces a product of a desired thickness, the mill having a plurality of time varying states and a process output, said method comprising the steps of:

coupling an intelligent control system to state signals that are representative of said time-varying states at a current time, said intelligent control system having an output node for generating an output signal, said intelligent control signal being trained in a training cycle wherein said each state signal is delayed by a predetermined time when presented to said control system with said process output, thereby synchronizing said process output with past state signals so that said output signal is predictive of said process output at a future time;

generating a reference signal indicative of a desired exit gauge;

deriving a first error signal that is representative of a difference between said reference signal and said output signal; and controlling the product thickness in accordance with said first error signal.

10. The method in accordance with claim 9, wherein said step of modulating is performed with a proportional integral-derivative controller.

11. The method in accordance with claim 9, wherein said step of deriving is performed with a comparator.

12. The method in accordance with claim 9, wherein said step of coupling is performed by coupling an input layer of an artificial neural network to said signals, said neural network having a hidden layer.

13. The method in accordance with claim 12, further comprising the steps of:

measuring an exit gauge at a point beyond a roll gap of the rolling mill;

providing an exit gauge signal responsive to a result of said step of measuring;

determining whether said artificial neural network is operating within predetermined limits;

in the event said artificial neural network is operating outside predetermined limits, deriving a second error signal that is representative of a difference between said reference signal and said exit gauge signal and modulating the product thickness in accordance with said second error signal.

14. The method in accordance with claim 9, wherein said step of coupling is performed by coupling a parallel cascade network to said signals, said parallel cascade network having a plurality of input nodes determined during training thereof, each said input node comprising a dynamic linear element cascaded with a static nonlinear system, said dynamic linear element being derived from a cross correlation between a said time-varying state and the output of the rolling mill.

15. The method in accordance with claim 14, further comprising the steps of:

measuring an exit gauge at a point beyond a roll gap of the rolling mill;

providing an exit gauge signal responsive to a result of said step of measuring;

determining whether said parallel cascade network is operating within predetermined limits;

in the event said parallel cascade network is operating outside predetermined limits, deriving a second error signal that is representative of a difference between said reference signal and said exit gauge signal and modulating the product thickness in accordance with said second error signal.

* * * * *